United States Patent [19]

Haraguchi et al.

[11] Patent Number: 5,495,460
[45] Date of Patent: Feb. 27, 1996

[54] OPTICAL DISK AND APPARATUS FOR REPRODUCING SIGNAL WITHOUT CROSSTALK

[75] Inventors: Yukiyoshi Haraguchi; Yoshimi Tomita, both of Tsurugashima, Japan

[73] Assignee: Pioneer Electronic Corporation, Tokyo, Japan

[21] Appl. No.: 90,697

[22] Filed: Jul. 13, 1993

[30] Foreign Application Priority Data

Jul. 21, 1992 [JP] Japan .................................. 4-193826
Jun. 21, 1993 [JP] Japan .................................. 5-149195

[51] Int. Cl.$^6$ ................................................. G11B 27/36
[52] U.S. Cl. ............................ 369/58; 369/111; 369/124; 369/275.3
[58] Field of Search .............................. 369/58, 54, 111, 369/124, 44.26, 44.34, 44.35, 44.36, 44.37, 275.3

[56] References Cited

U.S. PATENT DOCUMENTS

| | | | |
|---|---|---|---|
| 4,663,751 | 5/1987 | Kaku et al. | 369/44.26 |
| 4,764,914 | 8/1988 | Estes et al. | 369/58 |
| 5,280,466 | 11/1994 | Tomita | 369/43 X |

FOREIGN PATENT DOCUMENTS

3-40225 2/1991 Japan .

Primary Examiner—Aristotelis Psitos
Assistant Examiner—Duncan Wilkinson
Attorney, Agent, or Firm—Young & Thompson

[57] ABSTRACT

An optical disc includes a signal recording track spirally formed on the surface of the optical disc, information pits formed on the signal recording track, and a plurality of non-signal regions periodically formed on the signal recording track, wherein no information pit is formed on the non-signal region. An apparatus for reproducing signal recorded on the optical disc includes device for irradiating at least one light beam onto the surface of the optical disc, device for detecting light beams reflected by the surface of the optical disc and producing electrical signals, device for converting frequency characteristics of the electric signals in accordance with individually-alterable converting coefficients, device for adding the electrical signals to output a sum signal as a reproduction signal, device for detecting the non-signal regions, and device for setting the converting coefficients of the frequency characteristics converting device in accordance with the reproduction signal when the non-signal regions are detected.

5 Claims, 11 Drawing Sheets

OPTICAL DISK AND APPARATUS FOR REPRODUCING SIGNAL WITHOUT CROSSTALK

BACKGROUND OF THE INVENTION

The present invention relates to an optical disc and an apparatus for reproducing signal therefrom, and more particularly to an optical disc and an apparatus for effectively cancelling a crosstalk component mixed into a read-out signal of a target track from a plurality of neighboring tracks.

Recently a high density recording of an optical disc has been promoted or developed using various methods. For example, a method of enhancing the density of information pits in a direction along a track, a method of minimizing a diameter of spot of reading laser beam, and a method of reducing a track pitch are all known.

However, the method of reducing the track pitch has a restriction due to the diameter of an optical spot converged on a disc. Namely, if only the track pitch is reduced without reducing the diameter of spot of the laser beam, signals read out from neighboring tracks would be mixed into a read-out signal from a target track. Hence, a crosstalk component would be increased and it becomes impossible to accurately reproduce a recorded signal.

In order to cope with the adverse affect of the crosstalk phenomenon, the following countermeasures have been proposed. According to one method, a crosstalk component mixed into a read-out signal of a target track from inner and outer neighboring tracks thereof is detected and eliminated by reading the three tracks with three laser beams and subtracting the crosstalk component that has been generated based on two read-out signals of the neighboring tracks from the read-out track of the target track. Japanese Patent Application Laid-Open No. HEI 3-40225 discloses a method in which a frequency variable filter is provided for varying a frequency characteristic thereof so as to cancel a crosstalk component and the filter response becomes an optimum condition. In addition, there is proposed a method of deciding a cancellation coefficient of crosstalk component so as to minimize a correlation between the read-out signals of the neighboring tracks. This method is disclosed in "Nikkei Electronics" (Nikkei BP company, Vol. 495, Pages 98 to 99, Mar. 19, 1991).

Figure 1:
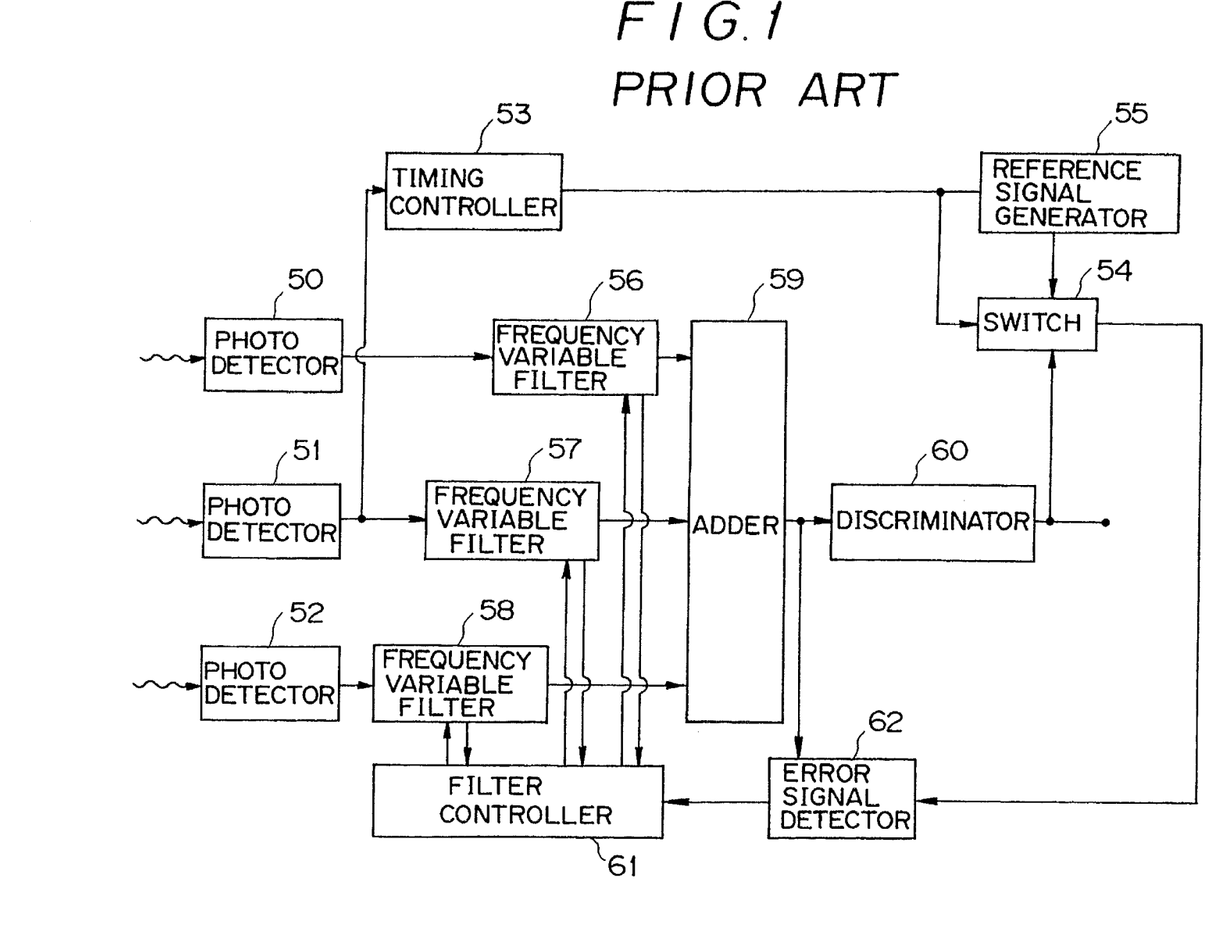
FIG. 1 is a block diagram showing a conventional optical disc reproducing apparatus.

FIG. 1 is a block diagram showing an apparatus for reproducing signal from an optical disc disclosed in the above-identified Japanese publication HEI 3-40225. The optical disc reproducing apparatus includes photo detectors 50, 51 and 52 for receiving reflected beams, respectively, from three tracks onto which light beams are protected and for photoelectrically converting the received beams into electric signals, frequency variable filters 56, 57 and 58, an adder 59 and a discriminator 60. The adder 59 adds the respective read-out signals of the three tracks after filter-processing by the frequency variable filters 56–58 so as to cancel the crosstalk component mixed into the signal of the target track. Filter coefficients of the frequency variable filters 56, 57 and 58 are renewed using a timing controller 53, a switch 54, a reference signal generator 55, a filter controller 61 and an error signal detector 62. More specifically, a predetermined preamble signal is recorded in advance on an optical disc and the preamble signal is initially reproduced prior to the reproduction of recorded data signal. The reproduced preamble signal which is outputted from the adder 59 and includes a crosstalk component and an interference is compared with a reference signal which is equal to a preamble signal recorded in advance, so as to detect an error therebetween. In response to the detected error, the respective frequency variable filters 56, 57 and 58 are controlled to renew their tap coefficients. As a result, a replica of the crosstalk component mixed from each neighboring tracks is outputted as reverse characteristics from each of the frequency variable filters 56, 57 and 58. Hence, the crosstalk component is removed in the adder 59 by adding the replicas outputted from the frequency variable filters 56, 57 and 58.

As described above, the conventional optical disc reproducing apparatus generates a signal corresponding to the crosstalk component from the neighboring tracks to thereby remove the crosstalk component. However, the above-described apparatus requires a circuit for generating the reference signal which is similar to the preamble signal beforehand recorded in the optical disc and a circuit for detecting the error between the preamble signal and the reference signal. This makes the circuitry complicated. Further, the above-described conventional method is only applicable to a digital signal processing.

SUMMARY OF THE INVENTION

An object of the present invention is to provide an optical disc and an apparatus for reproducing signal without crosstalk component from the optical disc in which a circuitry may be simplified and which can be applied also to an analog signal system.

According to one aspect of the present invention, there is provided an optical disc including a signal recording track spirally and concentrically formed on the surface of the optical disc, information pits formed on the signal recording track, and a plurality of non-signal regions periodically formed on the signal recording track, wherein no information pit is formed on the non-signal region.

According to another aspect of the present invention, there is provided an apparatus for reproducing signal recorded on the above optical disc including device for irradiating at least one light beam onto the surface of the optical disc, device for detecting light beams reflected by the surface of the optical disc and producing electrical signals, device for converting frequency characteristics of the electric signals in accordance with individually-alterable converting coefficients, device for adding the electrical signals to output a sum signal as a reproduction signal, device for detecting the non-signal regions, and device for setting the converting coefficients of the frequency characteristics converting device in accordance with the reproduction signal when the non-signal regions are detected.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 8 A–C are diagram showing read-in and read-out operations of memories shown in FIG. 7;

DESCRIPTION OF THE PREFERRED EMBODIMENTS

The present invention will now be described with reference to the accompanying drawings.

Figure 2A:
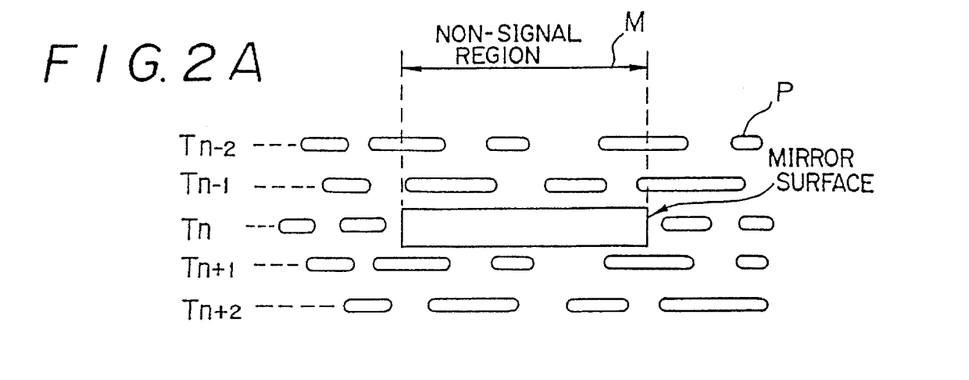
FIGS. 2A and 2B are schematic views for illustrating non-signal regions formed on a recording surface of an optical disc according to the present invention.
Figure 2B:
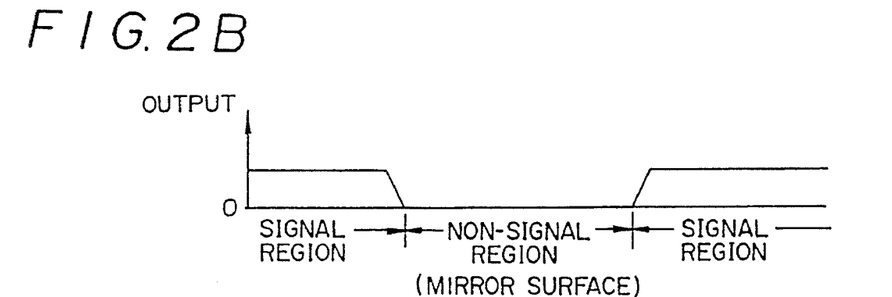

As shown in FIGS. 2A and 2B, on an optical disc according to the present invention, there are formed a plurality of signal recording tracks $T_{n-2}, \ldots, T_{n+2}$. On the signal recording tracks $T_{n-2}, \ldots, T_{n+2}$, pits P and non-signal regions M used for detecting a crosstalk component are formed on the signal recording tracks $T_{n-2}, \ldots, T_{n+2}$.

AS shown in FIG. 2A, the non-signal region M is formed as a mirror-finished surface on which no information pit is formed. The read-out signal in the non-signal region M ideally becomes zero as shown in FIG. 1B. However, in actuality, when the intervals between the target track $T_n$ and neighboring tracks $T_{n+1}$ and $T_{n-1}$ are reduced in comparison with the light beam spot to be projected in order to achieve the high density recording, the crosstalk components mixed from the neighboring tracks $T_{n+1}$ and $T_{n-1}$ are detected during the reading of the non-signal region. Accordingly, crosstalk cancellation is performed on the basis of the read-out signal detected in the non-signal regions M.

Figure 3:
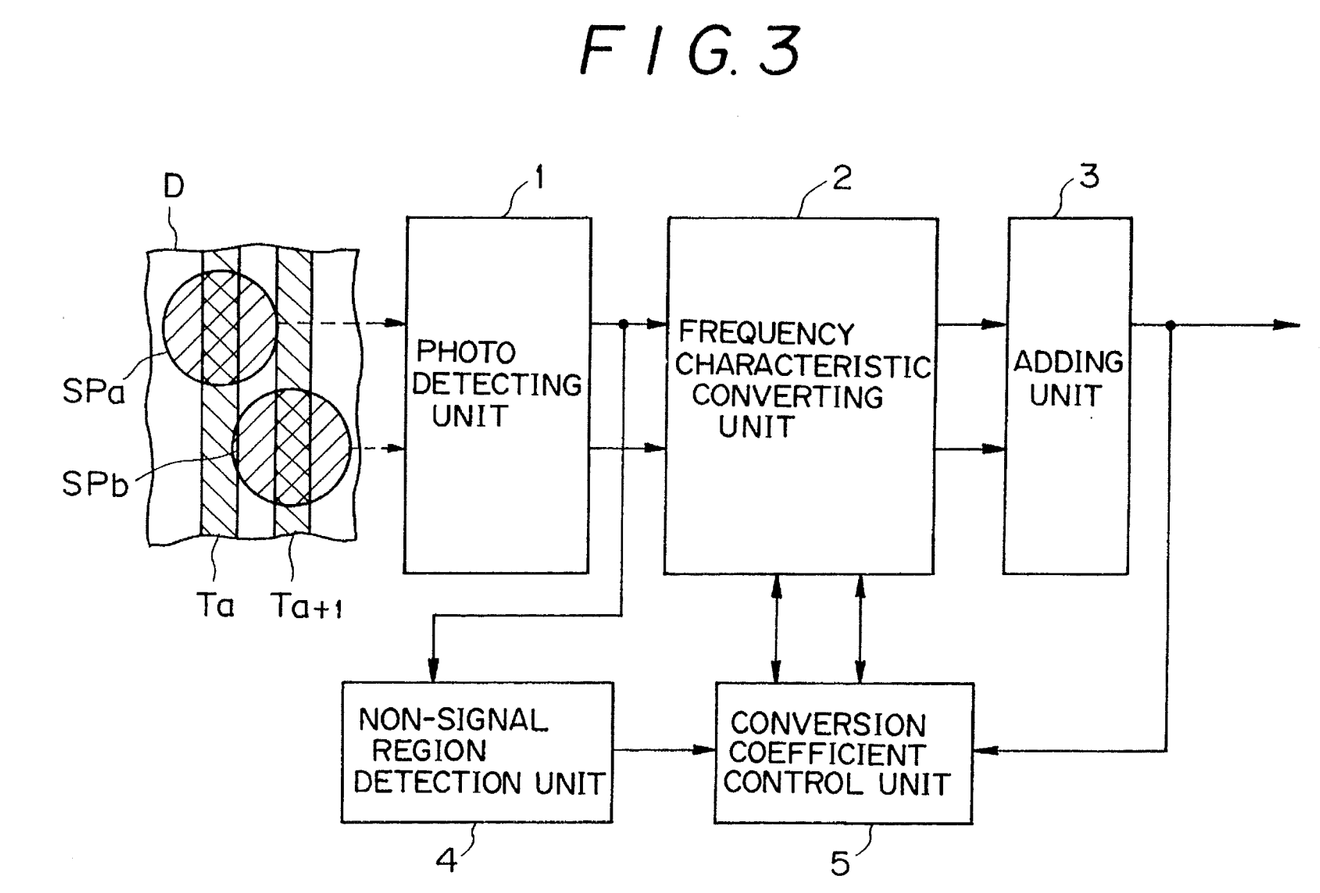
FIG. 3 is a theoretical diagram of an optical disc reproducing apparatus according to the present invention.

FIG. 3 shows a reproducing apparatus according to the present invention which reproduces a signal recorded on the optical disc shown in FIG. 2A. The signal reproducing apparatus detects reflected beams of at least one beam spot $SP_a$ and $SP_b$ produced on the surface of the optical disc D. The apparatus includes a photo-detecting unit 1, a frequency characteristic converting unit 2, an adding unit 3, a non-signal region detecting unit 4, and a conversion coefficient control unit 5.

The photo-detecting unit 1 detects the laser beam reflected by the surface of the optical disc and outputs a read-out signal of the tracks $T_a$ and $T_{a+1}$. The frequency characteristic converting unit 2 receives the read-out signals of the tracks $T_a$ and $T_{a+1}$, and converts the frequency characteristics of the received read-out signals in accordance with preset conversion coefficients. The adder 3 adds the respective output signals of the frequency characteristic converting unit 2. The non-signal region detection unit 4 detects the non-signal region M, and the conversion coefficient controller 5 sets the conversion coefficient of the frequency characteristic converting unit 2 in accordance with the output of the adder 3.

When the recording signal of the track $T_a$ is reproduced, first, reading laser beams are projected on the disc surface and the beam spots $SP_a$ and $SP_b$ are produced on the respective tracks $T_a$ and $T_{a+1}$, as shown in FIG. 3. The reflected beams of the beam spots $SP_a$ and $SP_b$ are detected by the photo-detecting unit 1 and the read-out signals of the respective tracks $T_a$ and $T_{a+1}$ are outputted. The frequency characteristics of the respective read-out signals are converted by the frequency characteristic converting unit 2 such as a transversal filter. Namely, the read-out signal of the neighboring track $T_{a+1}$ is converted into a signal corresponding to the crosstalk component by the frequency characteristic converting unit 2. From the adder 3, a reproduced signal from which the crosstalk component has been removed is outputted. The conversion coefficients of the frequency characteristic converting unit 2 are set as follows. The non-signal region M of the track $T_a$ is detected by the non-signal region detection unit 4. When the non-signal region M is detected, the conversion coefficient is varied so that the output signal of the adding unit 3 becomes equal to zero.

The specific embodiments of the present invention will now be described.

Figure 4:
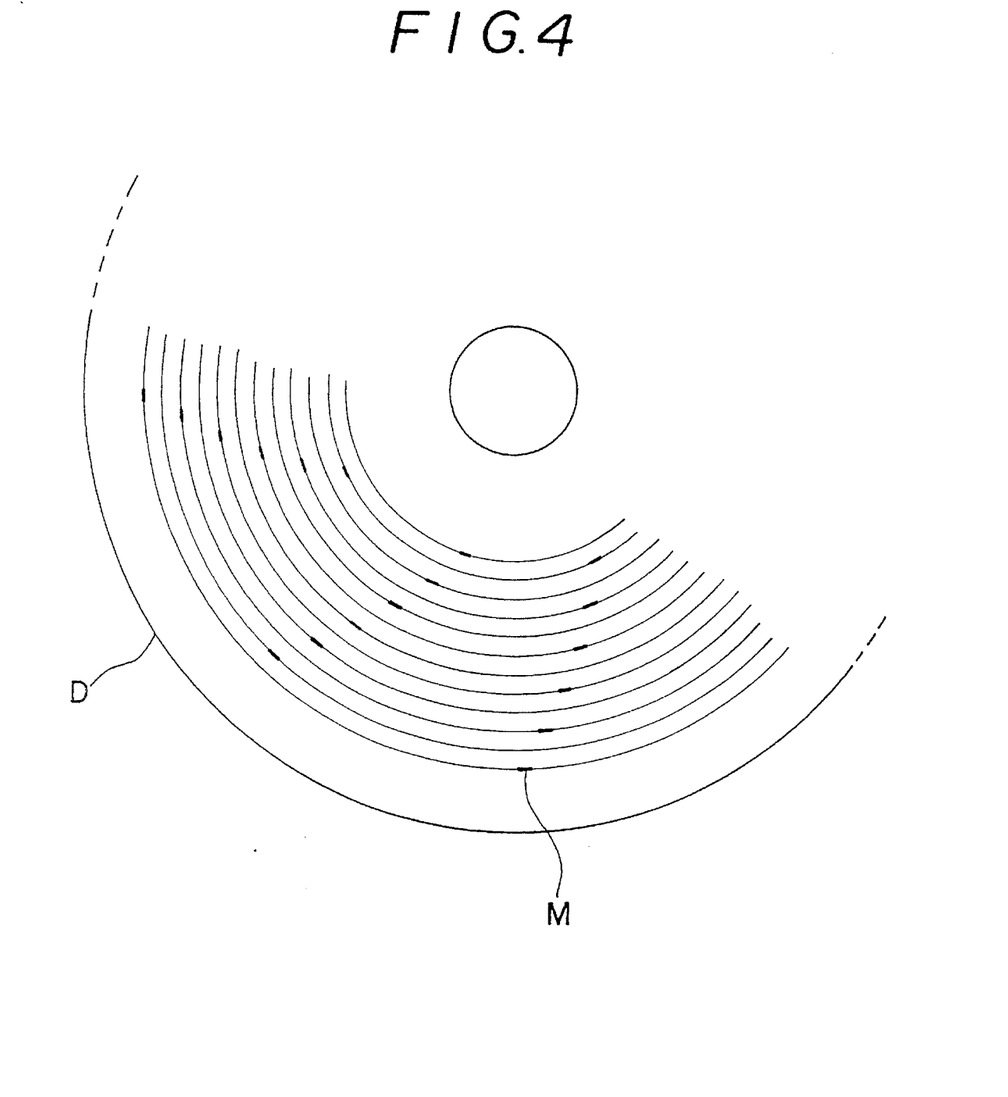
FIG. 4 is a schematic view showing formation of non-signal regions on the recording surface of the optical disc according to a first embodiment of the present invention.

1st Embodiment:

FIG. 4 schematically shows a format of the non-signal region formed on the optical disc according to the present invention. As shown in FIG. 4, the non-signal regions M are formed in the respective tracks of the optical disc D so as not to align with those on the neighboring tracks in the radial direction of the disc. In other words, the non-signal regions are formed so that each of the non-signal region is positioned out of alignment with at least one non-signal region out of two non-signal regions formed on inner and outer neighboring tracks in a radial direction of the optical disc, as depicted in FIG. 4. The plural non-signal regions M are formed between the series of pits in each tracks at a predetermined intervals. With this arrangement, renewals of the conversion coefficients are executed for a plurality of times with predetermined time intervals so that crosstalk components may be sufficiently removed.

Next, an embodiment of an apparatus for reproducing signals recorded on an optical disc where non-signal regions M are formed in the above manner will be described.

Figure 5:
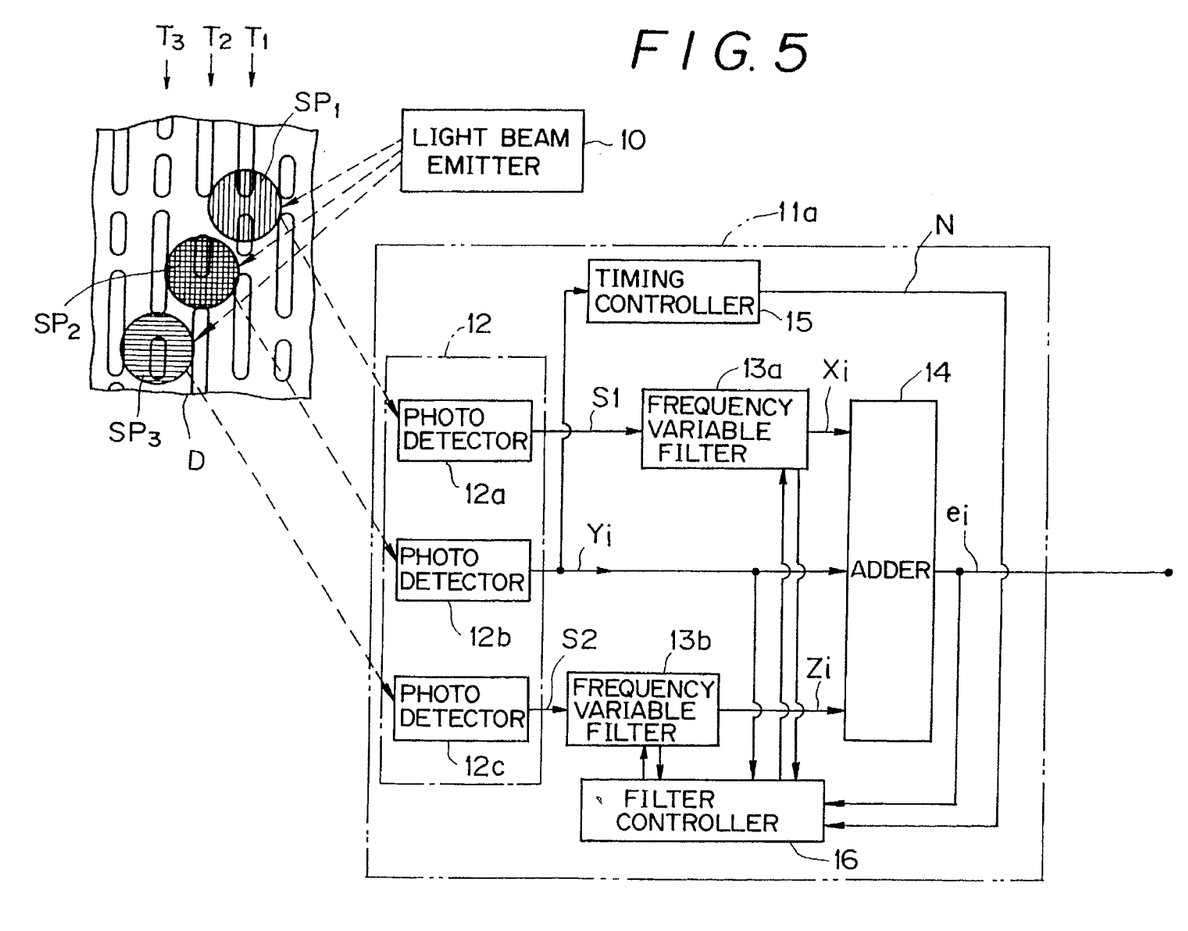
FIG. 5 is a block diagram showing an optical disc reproducing apparatus according to the first embodiment of the present invention.

FIG. 5 shows a configuration of an optical disc reproducing apparatus. As shown in FIG. 5, an optical disc reproducing apparatus 11a includes three photo detectors 12a–12c, frequency variable filters 13a and 13b, an adder 14, a timing controller 15 and a filter controller 16. When the optical disc reproducing apparatus 11a reproduces signal recorded on the optical disc D, a light-beam emitter 10 emits and irradiates light beams on a target track and neighboring tracks neighboring thereto in such a manner that three light spots $SP_1$, $SP_2$ and $SP_3$ are produced thereon. Each of the photo-detectors 12a–12c receives the reflected light beams of beam spots $SP_1$, $SP_2$ and $SP_3$ reflected by the surface of the optical disc D and photoelectrically converts the reflected beam into an electrical read-out signal. Each of read-out signals S1 and S2 outputted form the photo-detectors 12a and 12c are fed to the frequency variable filters 13a and 13b, respectively. The read-out signal. $Y_i$ outputted from the photo-detector 12b is fed to the timing controller 15 and the adder 14. The timing controller 15 receives the read-out signal $Y_i$ and detects the non-signal region M on the target track $T_2$ on which light spot $SP_2$ is produced. Since the non-signal region M is of a mirror-finished surface as shown in FIG. 2A, the read-out signal $Y_i$ keeps a magnitude level lower than a predetermined level for a predetermined time period. Hence, the timing controller detects this time period and outputs a detection signal N to the filter controller 16.

The frequency variable filters 13a and 13b, whose filter coefficients are set by the filter controller 16, vary the frequency characteristics of the read-out signals $S_1$ and $S_2$ which are the read-out signals of the neighboring tracks $T_1$ and $T_3$, and supplies the filtered signals $X_i$ and $Z_i$ to the adder 14. The filtered signal $X_i$ outputted from the frequency variable filter 13a, the signal $Y_i$ outputted from the photo-detector 12b which is representative of the read-out signal of the center track $T_2$, and the filtered signal $Z_i$ outputted from the frequency variable 13b are supplied to the adder 14 to produce a sum signal $e_i$. The sum signal $e_i$ outputted from the adder 14 is given by the following formula:

$$e_i = \Sigma C_j X_{i-j} + Y_i + \Sigma D_j Z_{i-j}$$

where $C_j$ and $D_j$ are the filter coefficients of the frequency variable filters 13a and 13b. The filter coefficients of the frequency variable filters 13a and 13b are determined by the filter controller 16 when the non-signal region is detected by the timing controller 15. Since the non-signal region M has mirror-finished surface, if no crosstalk component is mixed, the read-out signal of the target track $T_2$ during the non-signal region becomes equal to zero. Therefore, on the basis of the detection signal N outputted from the timing controller 15 and the sum signal $e_i$ outputted from the adder 14, the filter controller 16 varies the filter coefficients of the frequency variable filters 13a and 13b so that the sum $e_i$ becomes equal to zero. The filter controller 16 is composed of, for example, a digital signal processor (DSP) or the like.

Figure 6:
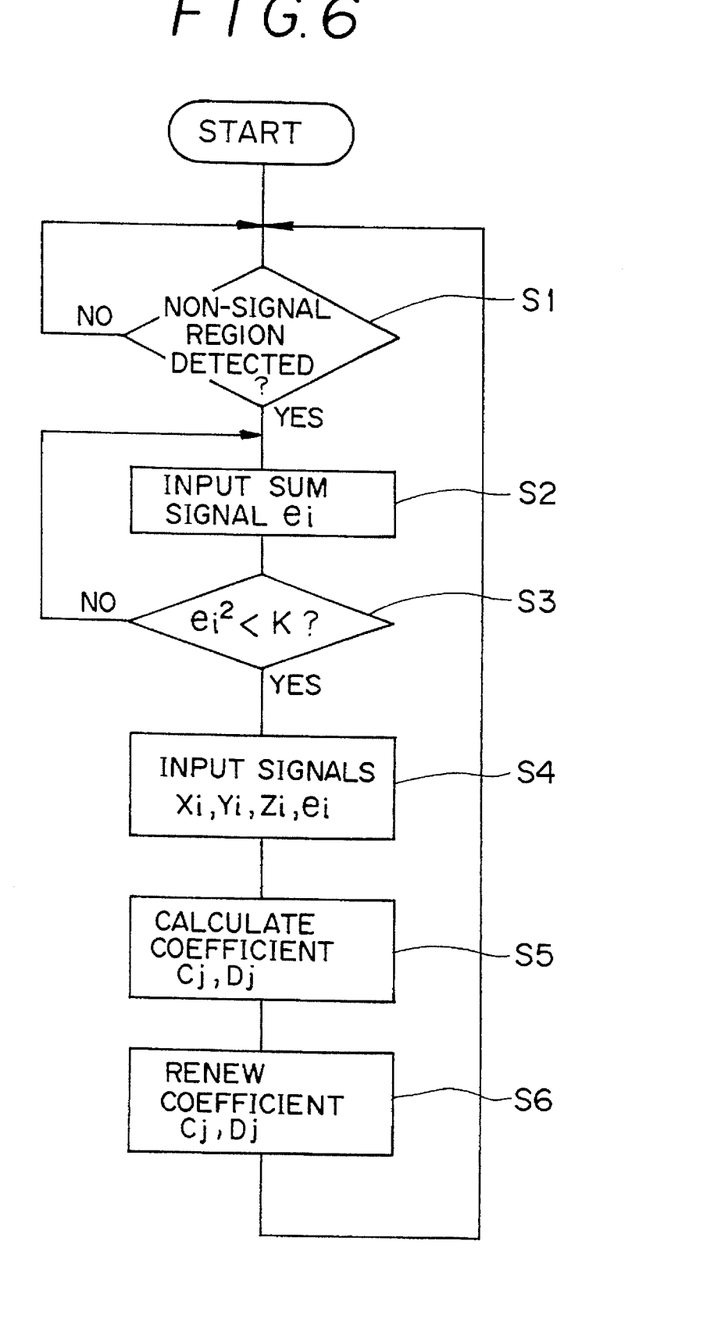
FIG. 6 is a flowchart showing an operation the filter controller according to the first embodiment of the present invention.

FIG. 6 is a flowchart showing a renewal operation of the filter coefficient of the frequency variable filters. This renewal operation is executed by the filter controller 16. Initially, the filter controller 16 receives the detection signal N outputted from the timing controller 15 and discriminates whether the non-signal region (mirror-finished portion) is detected or not in step S1. If the non-signal region is detected, the sum signal $e_i$ is supplied to the filter controller 16 in step S2 and it is discriminated whether the value $(e_i)^2$ is equal to or smaller than a predetermined value K in step S3. If the value $(e_i)^2$ is equal to or smaller than the predetermined threshold value K, then the signals $X_i$, $Y_i$, $z_i$ and $e_i$ are supplied into the adder 14 in step S4. Then, the filter controller 16 calculates the filter coefficients $C_j^{N+1}$ and $D_j^{N+1}$ according to the following equations so as to make the sum signal $e_i$ become equal to zero in step S5.

$$C_j^{N+1} = C_j^N - \alpha(\partial e_i^2 / \partial C_j)$$

$$D_j^{N+1} = D_j^N - \alpha(\partial e_i^2 / \partial D_j)$$

where $Cj^N$ and $Dj^N$ represent the filter coefficients obtained in the preceding renewal calculation of the filter coefficients. The values $(\partial e_i^2 / \partial C_j)$ and $(\partial e_i^2 / \partial D_j)$ are given by the following equations:

$$(\partial e_i^2 / \partial C_j) = 2 \cdot e_i \cdot X_{i-j}$$

$$(\partial e_i^2 / \partial D_j) = 2 \cdot e_i \cdot Z_{i-j}$$

When the filter coefficients $C_j^{N+1}$ and $D_j^{N+1}$ are calculated, the new coefficients $C_j^{N+1}$ and $D_j^{N+1}$ are set in the frequency variable filters 13a and 13b, respectively, in step S6. Then, the operation returns to step S1, and when the subsequent non-signal region is detected, the filter coefficients are again renewed-in the same manner as described above.

As described above, according to this embodiment, the read-out signals of the three tracks are simultaneously produced on the basis of the light beam reflected by the target track and neighboring tracks, and the crosstalk component is removed utilizing the read-out signals of the neighboring tracks. When the non-signal region of the target track is detected, the filter coefficients of the frequency variable filters for converting the frequency characteristics of the read-out signals are renewed so that the sum signal outputted from the adder becomes zero during the non-signal region.

Accordingly, it is sufficient to calculate and set the filter coefficients so that the sum signal during the non-signal region is zero. Hence, no complicated circuitry is required and the circuit configuration is simplified. Further, since the filter coefficients are renewed in accordance with the read-out signal of the mirror portion, even if the signal recorded on the optical disc is of an analog type, it is possible to effectively cancel the crosstalk component in the same manner.

Next, another optical disc reproducing apparatus according to the present invention will be described.

Figure 7:
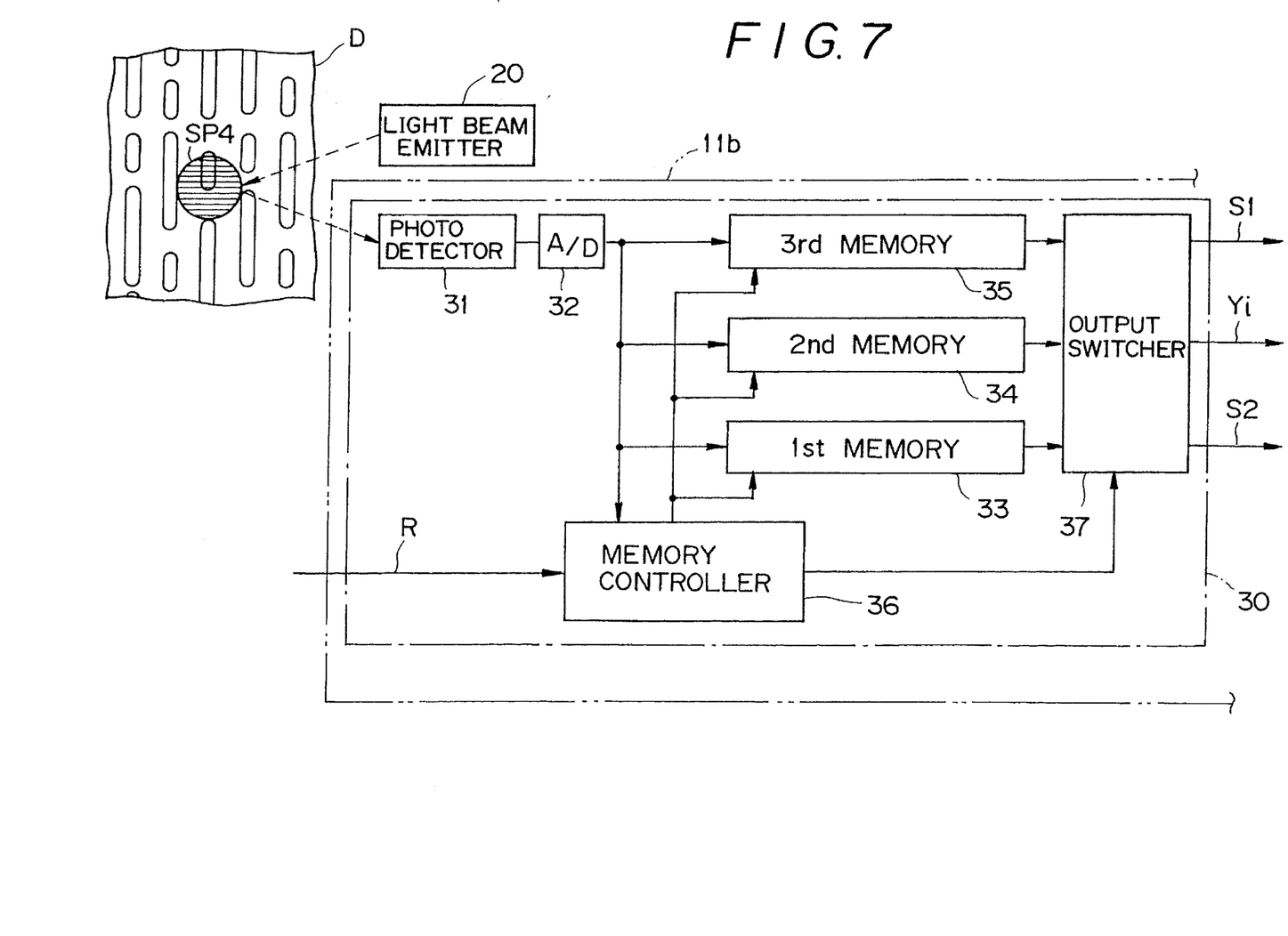
FIG. 7 is a block diagram showing a photo detector unit of an optical disc reproducing apparatus according to the first embodiment of the present invention.

As shown in FIG. 7, the optical disc reproducing apparatus is adapted to receive reflected light of a single beam spot $SP_4$ which is projected onto the track of the optical disc D from a light beam emitter 20 and to cancel the crosstalk component using read-out signals of the three neighboring tracks. For this reason, in order to simultaneously process the read-out signals of the three neighboring tracks in the same way as in the apparatus shown in FIG. 5, a photo-detector unit 30 is constructed so as to temporarily store the read-out signals of the neighboring three tracks and output them simultaneously.

FIG. 7 shows the optical disc reproducing apparatus 11b which is different from the apparatus shown in FIG. 5 in its configuration of photo-detector unit 30. Therefore, the other parts are the same as that of the apparatus shown in FIG. 5 and the description thereof will be omitted for the sake of brevity.

The optical detector unit 30 shown in FIG. 7 includes a photo-detector 31, an A/D converter 32, first to third memories 33–35, a memory controller 36 and an output switcher 37. The photo detector 31 receives the reflected light of the beam spot $SP_4$ and converts the light beam into electrical read-out signal. The A/D converter 32 converts the analog read-out signal outputted from the photo detector 31 into a digital signal. Each of the first, second and third memories 33, 34 and 35 has a storage capacity enough to store the digitized read-out signal corresponding to one revolution of the optical disc. The memory controller 36 receives a revolution synchronous signal R of the optical disc D and effects read-in and read-out operations of the memories 33, 34 and 35 in correspondence with the revolution synchronous signal R. The revolution synchronous signal R is generated at every revolution of the optical disc. The output switcher 37 switches over the output signals of the memories 33, 34 and 35 in accordance with an instruction from the memory controller 36.

With such an arrangement, when the revolution synchronous signal R is supplied to the memory controller 36, that is, recorded data is read out by one revolution of the disc D, the memory controller 36 controls the memories 33, 34 and 35 to store the output data of the A/D converter 32 in turn. For instance, in the memory control, the memory controller 36 supplies an address signal to the first memory 33 in response to the receipt of a first revolution synchronous signal and store the read-out signal of a first track in the first memory from the leading address thereof. Then, the memory controller 36 switches the memory operation to the second memory 34 in response to the receipt of the next revolution synchronous signal, supplies the address signal and stores the read-out signal of the second track (outer neighboring track of the first track) from the leading address thereof. Further, the memory controller 36 switches the memory operation to the third memory 35 in response to the receipt of the third revolution synchronous signal, and the read-out signal of the third track is stored in the third memory in the same manner.

Furthermore, on receiving a next revolution synchronous signal, the memory controller 36 switches the memory operation to the first memory 33 again and stores the read-out signal into the first memory 33. In this manner, the three memories 33–35 are switched over every time when the read-out signal corresponding to one track is read out. Hence, the read-out signals of the neighboring three tracks are always stored in the first to third memories 33–35.

Figure 8A:
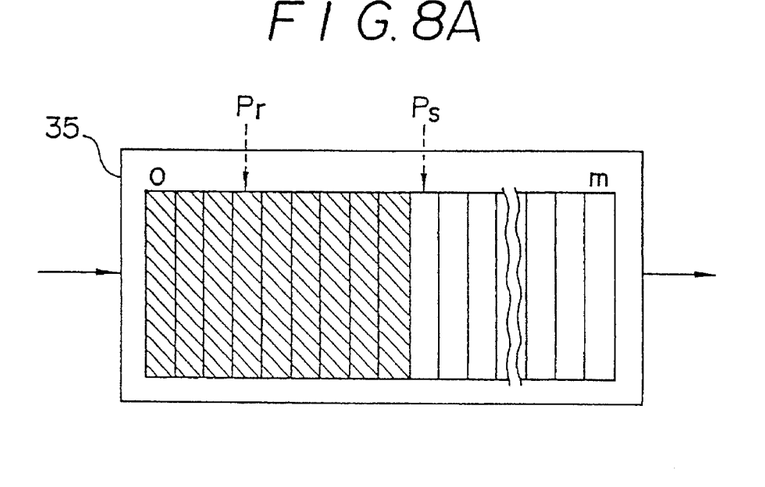
Figure 8B:
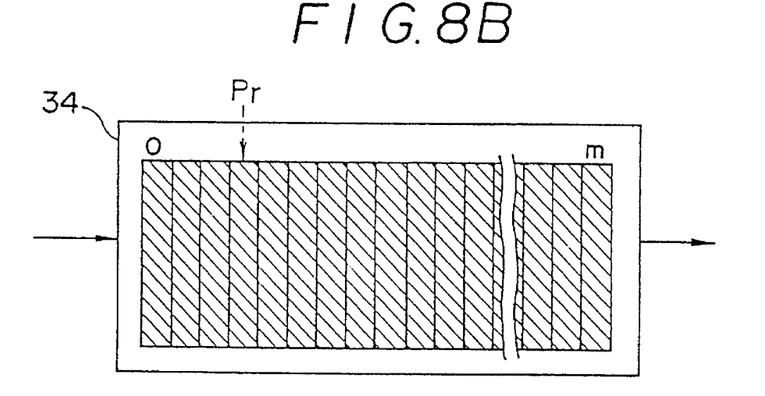
Figure 8C:
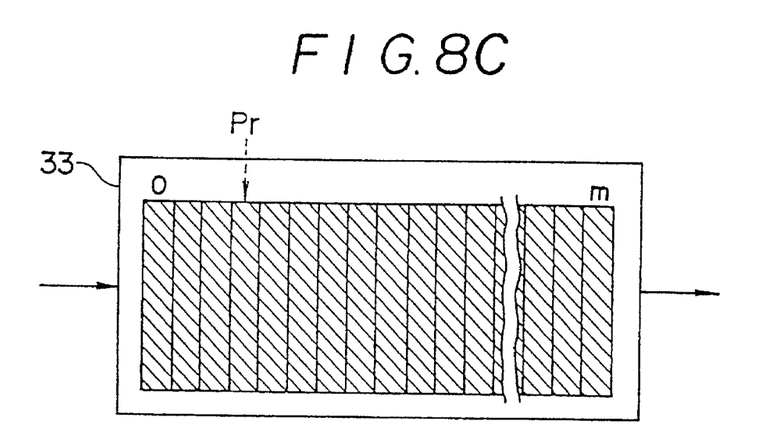

FIG. 8 illustrates the memory control of reading data in and out of the memories 33, 34 and 35. In FIG. 8, the hatched portions represent storage areas on which the data has been stored, $P_s$ represents a read-in pointer indicating address on which next data is to be stored, and $P_r$ represents a read-out pointer indicating address from which stored data is to be read out. FIG. 8 shows a state where the read-out signal of the first and second tracks have been stored in the first and second memories 33 and 34 from address "0" to address "m" thereof, and the read-out signal of the subsequent track (third track) has been stored in the third memory 35 from address "0" to an address just before the address pointed by the read-in pointer $P_s$. The subsequent read-out signals will be stored in the third memory 35 from the address indicated by the memory point $P_s$.

The memory controller 36 controls the memories 33–35 to read out and output the data stored in each memories in the same cyclic period as that of the data storing, simultaneous with the data storing into the memories 33, 34 and 35. In this reading control, for instance, assuming now that the read-out signals have been stored in the first memory 33 and the second memory 34 as shown in FIG. 8, the stored data are simultaneously and synchronously read out from each of the three memories 33–35 from the same address (indicated by the pointer $P_r$) soon after the data storage is started in the third memory 35. When the data storage into the third memory 35 is completed, then data is stored into the first memory 33. Similarly, when the synchronous read out of the data from the respective memories 33–35 is completed up to the address m, the reading operation is repeatedly started from the leading address of each of the three memories.

According to this embodiment, the temporary storage and simultaneous read-out of the data in and from the memories 33, 34 and 35 would provide substantially the same effect as the simultaneous read-out of the three neighboring tracks using the three light spots and three photo detectors by the apparatus shown in FIG. 5. For example, when the read-out signal of the first track is stored in the first memory 33, the read-out signal of the second track is stored in the second memory 34 and subsequently the read-out signal of the third track is stored in the third memory. After the storage of the data into the third memory 35 is started, the read-out signals of the three tracks respectively stored in the three memories 33–35 are simultaneously and synchronously read out as if these signals were read out simultaneously. In this case, the read-out signal of the target track is outputted from the second memory 34. When the read-out signal of the fourth track is stored in the first memory 33, the read-out signal of the target track is outputted from the third memory 35. Accordingly, the memory controller 36 controls the respective memories 33–35 and the output switcher 37 so that the output switcher 37 constantly outputs the read-out signal of the target track as the signal $Y_i$ and the read-out signals of the neighboring two tracks as the signals $S_1$ and $S_2$.

On the basis of the signals $Y_i$, $S_1$ and $S_2$ outputted from the photo-detecting unit 30, the same processing as the apparatus shown in FIG. 5 is performed so as to cancel crosstalk component and generate a reproduced signal from which the crosstalk component is removed. In the apparatus shown in FIG. 5, the crosstalk cancellation is executed based on the analog read-out signals. However, it is possible to carry out the same analog process in this apparatus by providing D/A converters on an output side of the photo detecting unit 30.

As described above, according to the apparatus shown in FIG. 7, since the read-out signals of the neighboring three tracks are temporarily stored in the memories and simultaneously outputted to cancel the crosstalk in the reproduced signals, it is sufficient to project only a single light beam onto the optical disc unlike the apparatus shown in FIG. 5. Hence, it is unnecessary to use a complicated reproduction system which requires precise adjustment of the optical system for projecting the three spots in the appropriate positions.

In the above description, the crosstalk cancellation is performed using the read-out signals of the two neighboring tracks. However, when the crosstalk component is mixed in from only one side track neighboring to the target track due to length of the track pitch or projecting condition of the light beams, it is possible to cancel the crosstalk component by filtering read-out signal of only one neighboring track.

2nd Embodiment:

An optical disc and an optical disc reproducing apparatus according to a second embodiment of the present invention will now be described.

The concept of this embodiment is similar to that of the above described first embodiment in that non-signal regions are formed on the optical disc and crosstalk component is cancelled utilizing read-out signal of the non-signal region. However, an optical disc according to the second embodiment is different from that of the first embodiment in the novel formation of the non-signal regions on the optical disc.

Figure 9:
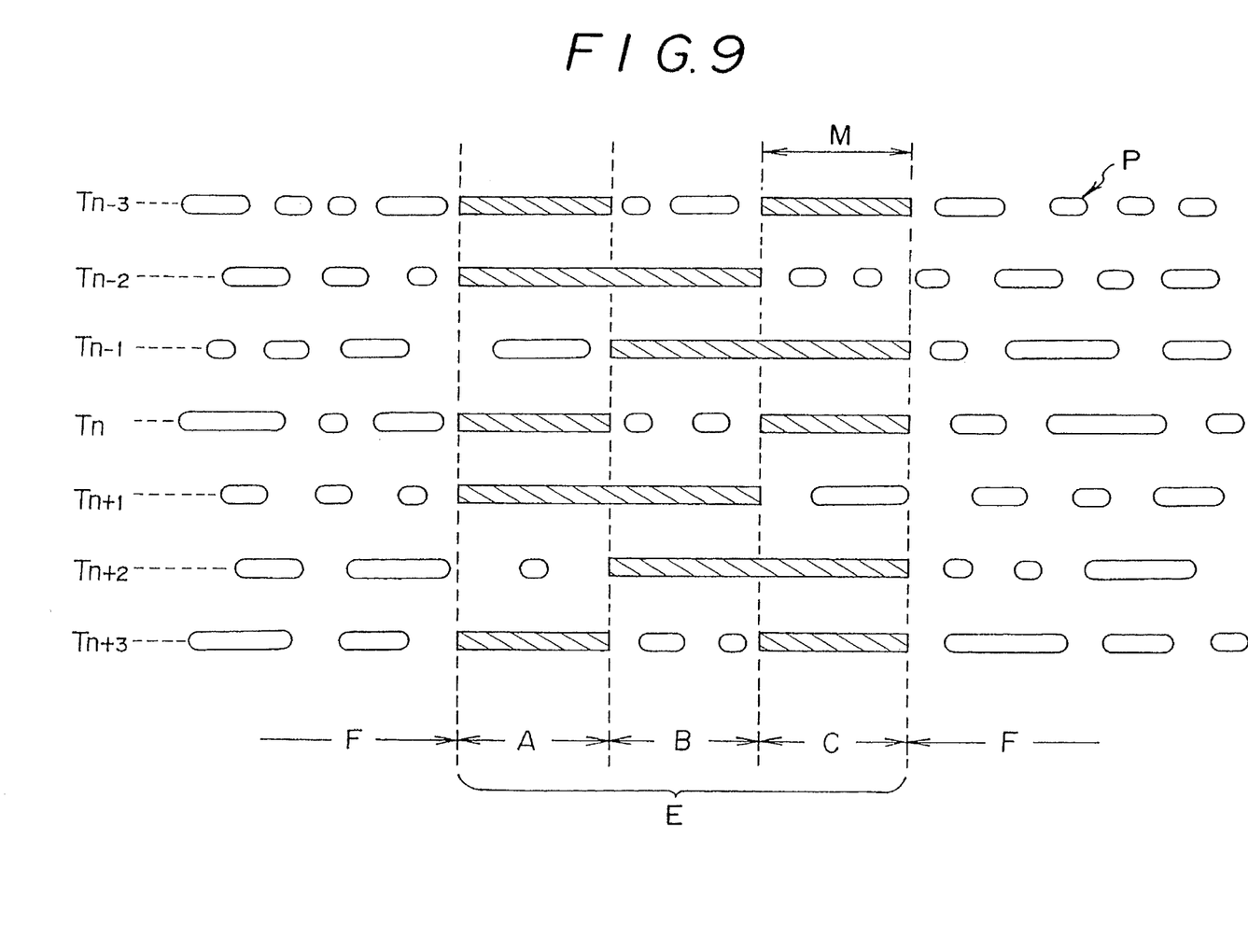
FIG. 9 is a schematic view showing formation of non-signal regions on the recording surface of the optical disc according to the second embodiment of the present invention.

FIG. 9 shows a formation of the non-signal regions formed on the surface of the optical disc. As shown in FIG. 9, on the optical disc according to the third embodiment, crosstalk detection region E including sub-regions A to C is formed. The non-signal regions M are formed in the crosstalk detection region E in such a manner that the non-signal region M is formed on every neighboring two tracks in a radial direction of the disc in two sub-regions in the crosstalk detection region E. More specifically, the crosstalk detection region E has three sub-regions divided in the tangential direction of the disc. In one of the three sub-regions, a center track of three neighboring tracks and a neighboring track on one side of the center track are mirror-finished non-signal region, and in another sub-region, the center track and a neighboring track on the other side of the center track are mirror-finished non-signal region.

Figure 10:
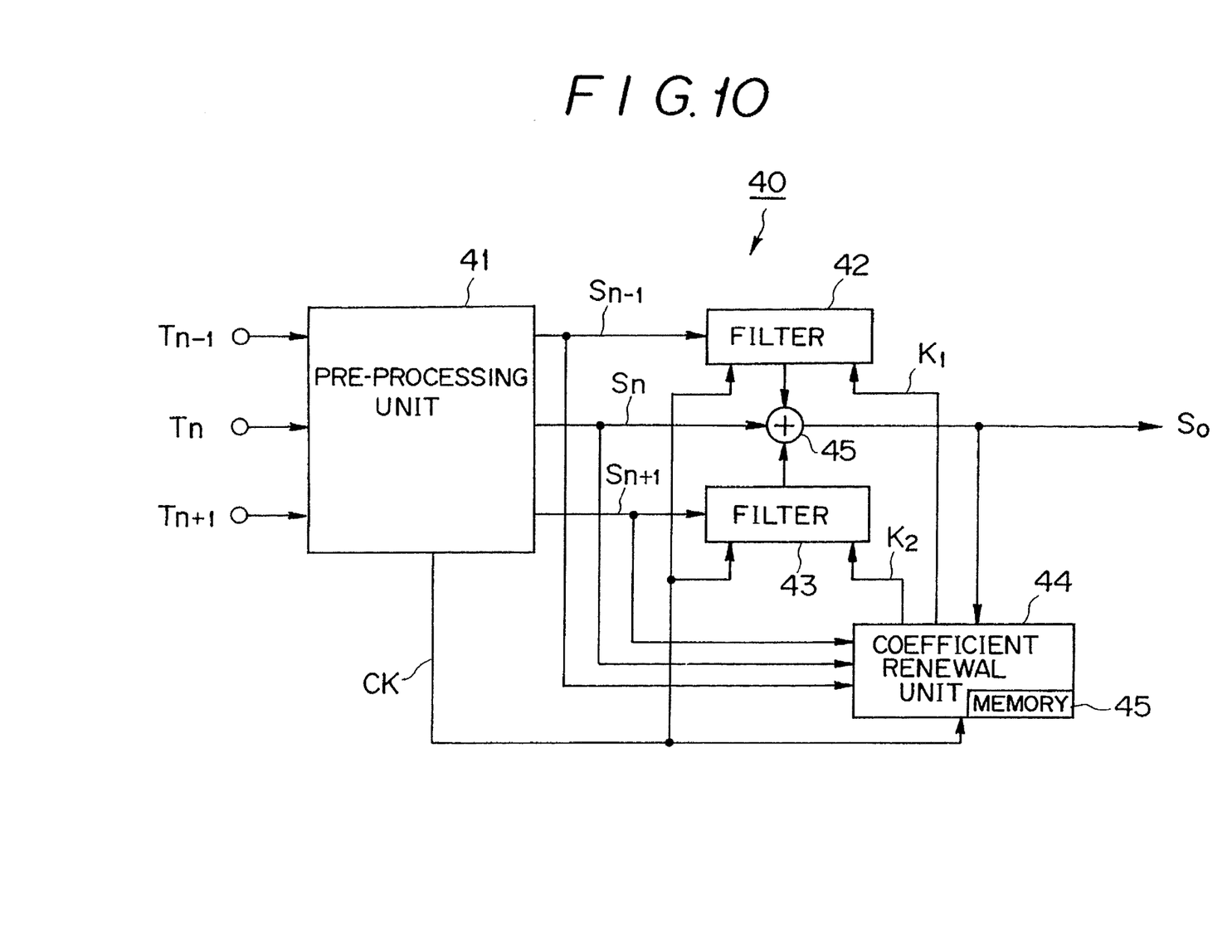
FIG. 10 is a block diagram showing an optical disc reproducing apparatus according to the second embodiment of the present invention.

FIG. 10 shows an optical disc reproducing apparatus which reproduces signal recorded on the optical disc shown in FIG. 9. As shown in FIG. 10, the optical disc reproducing apparatus 40 includes a pre-processing unit 41, two filters 42 and 43, a coefficient renewal unit 44 and an adder 45. The pre-processing unit 41 receives a read-out signal of a target track (center track) $T_n$ and read-out signals of inner neighboring track $T_{n+1}$ and outer neighboring track $T_{n+1}$. The pre-processing unit 41 conducts appropriate processing including A/D conversion, extraction of clock signal CK and timing control, etc. onto the inputted read-out signals and outputs signals $S_{n-1}$, $S_n$ and $S_{n+1}$. The signals $S_{n-1}$ and $S_{n+1}$ are supplied to the filters 42 and 43, respectively, and the signal $S_n$ is supplied to the adder 45. Each of the filters 42 and 43 conducts adaptive filtering onto the signals $S_{n-1}$ and $S_{n+1}$ using coefficients $K_1$ and $K_2$ which are calculated and renewed by the coefficient renewal unit 44. The filtered signals are fed to the adder 45. The adder 45 adds the inputted signals to produce and output a sum signal as a reproduction signal $S_0$ of the target track $T_n$. The coefficient renewal unit 44 receives the signals $S_{n-1}$, $S_n$ and $S_{n+1}$, the reproduction data $S_0$ and the clock signal CK, and renews the coefficients of the filters 42 and 43 on the basis of these received signals.

Next, crosstalk cancel operation will be described below. Now, assuming that signal recorded on the target track $T_n$ of the optical disc shown in FIG. 9 is to be reproduced, signals of the neighboring tracks $T_{n-1}$ and $T_{n+1}$ are simultaneously read out. The read-out signal of the target track $T_n$ includes crosstalk component mixed in from the neighboring tracks $T_{n-1}$ and $T_{n+1}$. When the reading light beams enter the sub-region A in which both of the tracks $T_n$ and $T_{n+1}$ are mirror-finished non-signal region, only a crosstalk component mixed into the target track $T_n$ from the track $T_{n+1}$ is detected because no crosstalk component is mixed into the track $T_n$ from the track $T_{n+1}$. Further, for the same reason, only a crosstalk component mixed into the target track $T_n$ from the track $T_{n+1}$ is detected in the sub-region C.

In response to this, the coefficient renewal unit 44 calculates and renews the filter coefficient of the filter 42 on the basis of the read-out signals $S_n$ and $S_{n-1}$ obtained in the sub-region A, so that the crosstalk component mixed into the target track $T_n$ from the track $T_{n-1}$ becomes zero. Further, in a similar manner, the coefficient renewal unit 44 calculates and renews the filter coefficient of the filter 43 on the basis of the read-out signals $S_n$ and $S_{n+1}$ obtained in the sub-region C, so that the crosstalk component mixed into the target track $T_n$ from the track $T_{n+1}$ also becomes zero. As a result of this coefficient renewal, crosstalk components are eliminated from the read-out signal of the target track $T_n$ and accurate data is reproduced in the data region F succeeding to the crosstalk detection region E.

Figure 11:
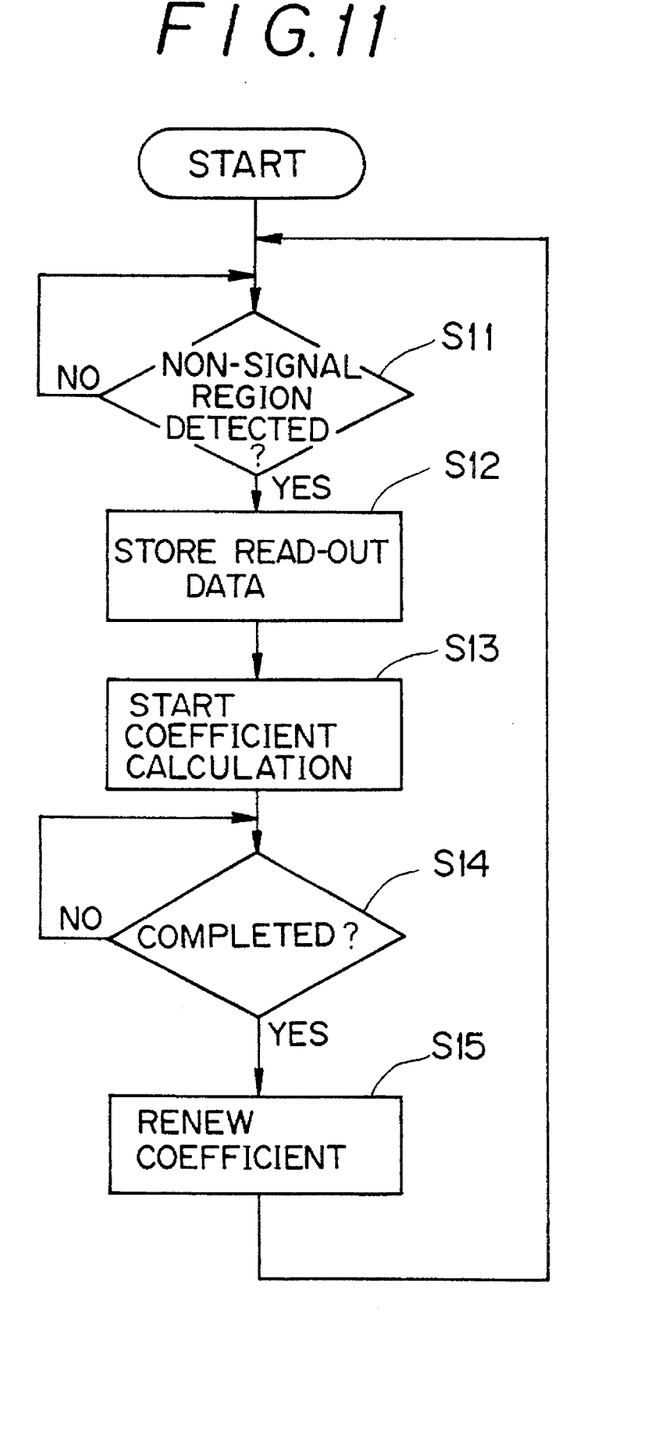
FIG. 11 is a flowchart showing an operation of the coefficient renewal unit according to the second embodiment of the present invention.

Next, the renewal operation of the filter coefficient will be described with reference to the flowchart shown in FIG. 11.

First, when the non-signal regions in the crosstalk detection region E is detected by the coefficient renewal unit 44 in step S11, the coefficient renewal unit 44 temporary stores the read-out signals of the three tracks in step S12. Then, the coefficient renewal unit 44 starts calculating the coefficients of the filters 42 and 43 on the basis of the stored read-out data in step S13. When completion of the coefficient calculation is discriminated in step S14, the coefficient renewal unit 44 supplies the calculated filter coefficients $K_1$ and $K_2$ to the filters 42 and 43 for the renewal thereof in step S15. Then, the renewal processing in ended. The filter coefficient is calculated according to an appropriate adaptive signal processing algorithm such as a Least Square Method.

Since the crosstalk detection region E shown in FIG. 9 are periodically formed on the surface of the optical disc with a predetermined interval (predetermined length of data region F), the coefficients of the respective filters 42 and 43 are renewed every time when the reading beams enter the crosstalk detection regions. Hence, crosstalk cancellation can be accurately and constantly performed.

It is to be noted that the pits formed in the crosstalk detection region E serves as reference signal for detecting crosstalk component. That is, if the pits formed in the crosstalk detection region E are of patterns whose reproduction signal only has a certain limited frequency range, only crosstalk component within such a frequency range can be cancelled and component out of the frequency range cannot be sufficiently eliminated. Therefore, the pits formed in the crosstalk detection region are preferably of various patterns so that crosstalk component of sufficient wide frequency band can be eliminated.

As described above, with the optical disc and the reproducing apparatus according to the present invention, since it is sufficient to calculate and set the filter coefficients so that the reproduced signal in the mirror-finished non-signal region becomes zero level, it is possible to dispense with a complicated circuitry and to simplify the circuitry. Further, since the filter coefficients are varied in accordance with the reproduced signal obtained in the non-signal region, even if data is recorded on the optical disc by analog recording, it is possible to sufficiently cancel the crosstalk component as well as the case of digital recording.

What is claimed is:

1. An apparatus for reproducing signal recorded on an optical disc, said optical disc comprising a signal recording track spirally formed on the surface of the optical disc; information pits formed on said signal recording track; and a plurality of non-signal regions periodically formed on said signal recording track wherein no information pit is formed in the non-signal regions and each of the plurality of non-signal regions comprises a mirror-finished surface and is positioned out of alignment with at least one non-signal region out of two non-signal regions formed on both inner and outer neighboring tracks in a radial direction of the optical disc, said apparatus comprising:

means for irradiating light beams onto the surface of said optical disc;

means for detecting light beams reflected by the surface of said optical disc and producing electrical signals;

means for converting frequency characteristics of the electric signals in accordance with individually-alterable converting coefficients;

means for adding the electrical signals to output a sum signal as a reproduction signal;

means for detecting said non-signal regions; and means for setting the converting coefficients of said frequency characteristics converting means in accordance with the reproduction signal when the non-signal region is detected.

2. An apparatus according to claim 1, wherein said light beams detecting means comprise a plurality of converting means for photoelectrically converting the detected light beams into electrical signals and producing electrical signals of a target track and at least one track neighboring to the target track.

3. An apparatus according to claim 2, wherein said frequency characteristics converting means convert frequency characteristics of the electric signals of the neighboring track.

4. An apparatus according to claim 1, wherein said adding means add the electrical signal of a target track and frequency-converted electrical signals of neighboring tracks neighboring to the target track.

5. An apparatus for reproducing signal recorded on an optical disc, said optical disc comprising a signal recording track spirally formed on the surface of the optical disc; information pits formed on said signal recording track; and a plurality of non-signal regions periodically formed on said signal recording track wherein no information pit is formed in the non-signal regions and each of the plurality of non-signal regions comprises a mirror-finished surface and is positioned out of alignment with at least one non-signal region out of two non-signal regions formed on both inner and outer neighboring tracks in a radial direction of the optical disc, said apparatus comprising:

means for irradiating a light beam onto the surface of said optical disc;

means for detecting a light beam reflected by the surface of said optical disc and producing an electrical signal;

means for storing the electrical signal and simultaneously and synchronously outputting stored electrical signals of a plurality of neighboring tracks;

means for converting frequency characteristics of the electric signals in accordance with individually-alterable converting coefficients;

means for adding the electrical signals to output a sum signal as a reproduction signal;

means for detecting said non-signal regions; and means for setting the converting coefficients of said frequency characteristics converting means in accordance with the reproduction signal when the non-signal region is detected.

* * * * *